May 17, 1949. A. ALLAN ET AL 2,470,675
SPRING-OPERATED DRIVING MECHANISM
Filed Jan. 23, 1945 4 Sheets-Sheet 1
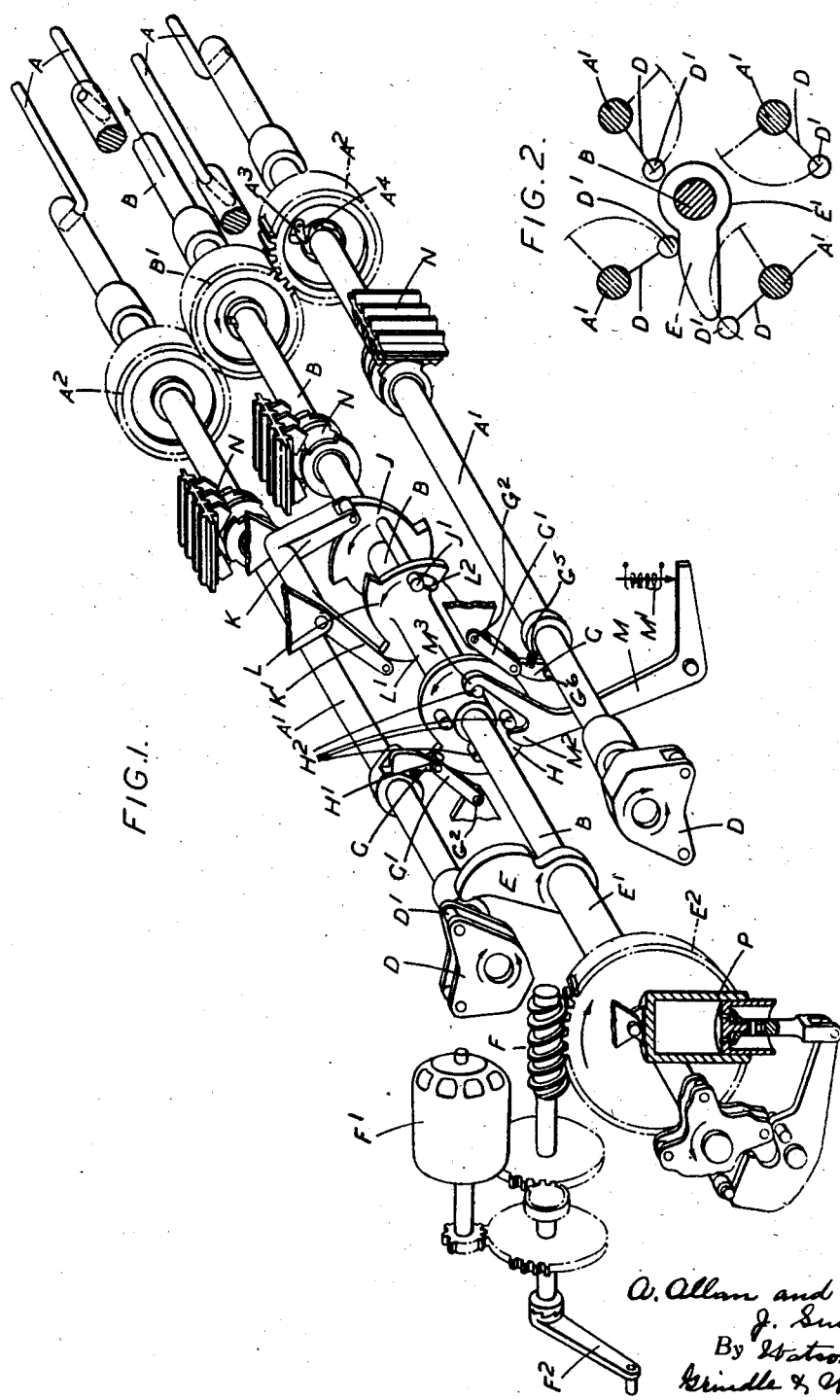

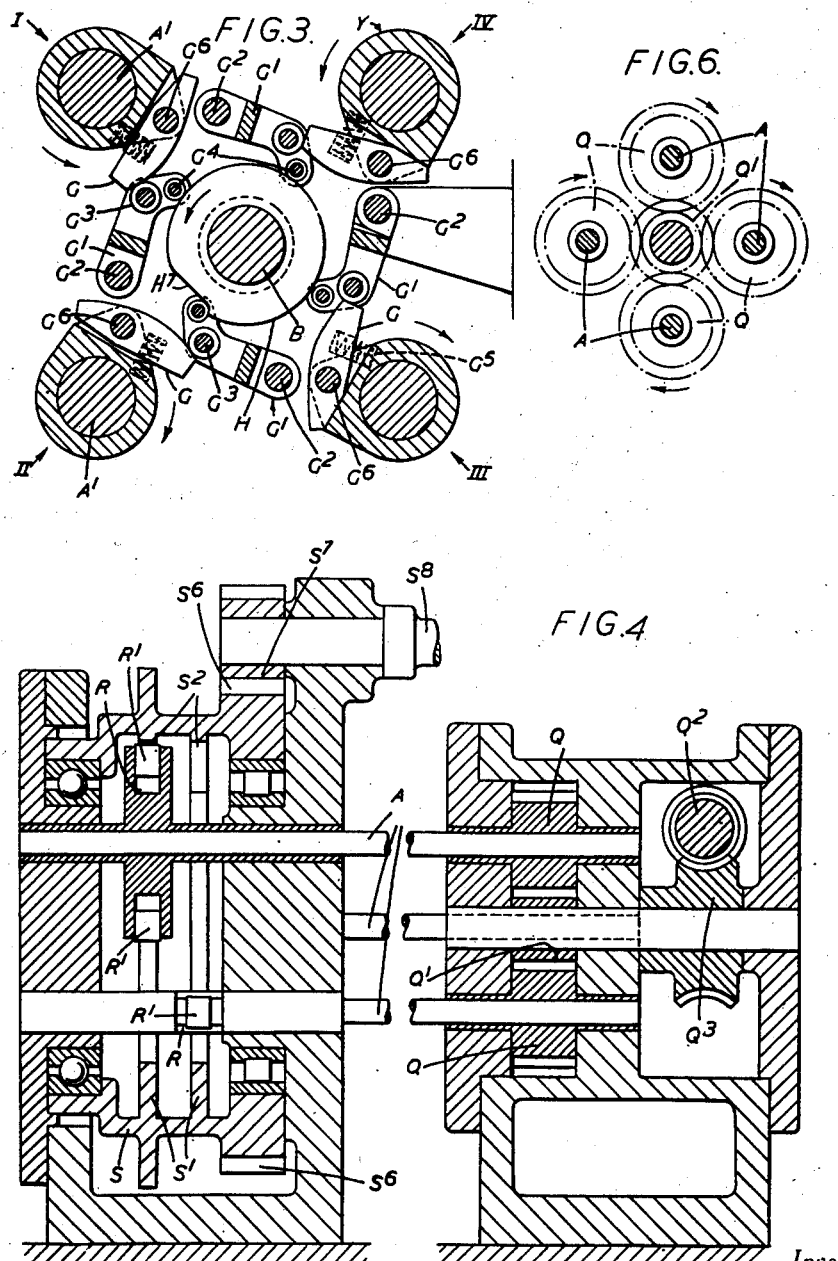

May 17, 1949.　　　　A. ALLAN ET AL　　　　2,470,675
SPRING-OPERATED DRIVING MECHANISM
Filed Jan. 23, 1945　　　　　　　　　　　　　　4 Sheets-Sheet 3
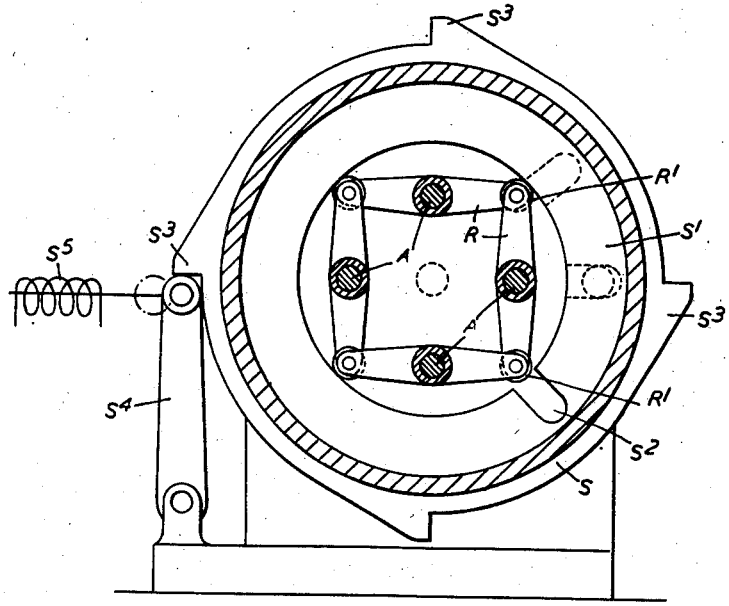
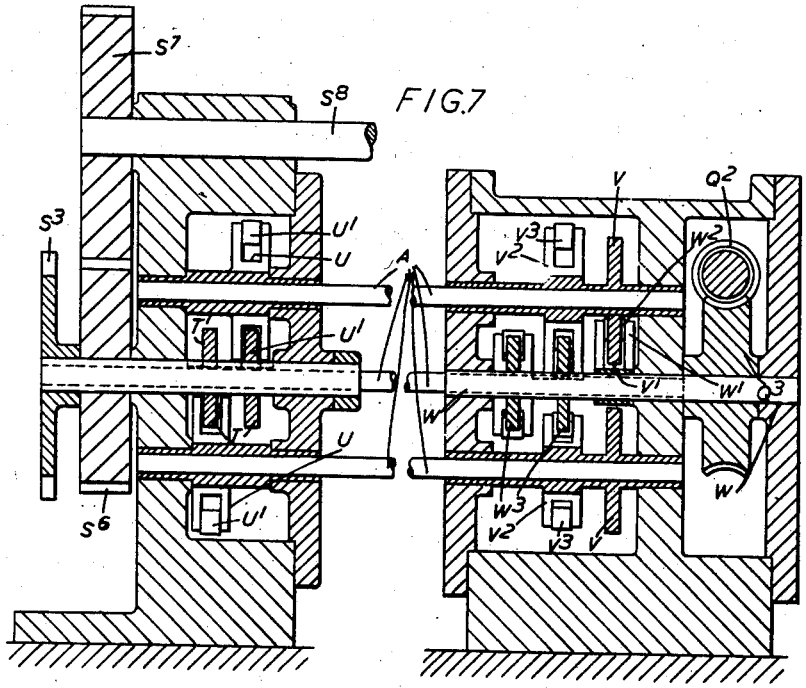

May 17, 1949.  A. ALLAN ET AL  2,470,675
SPRING-OPERATED DRIVING MECHANISM
Filed Jan. 23, 1945  4 Sheets-Sheet 4
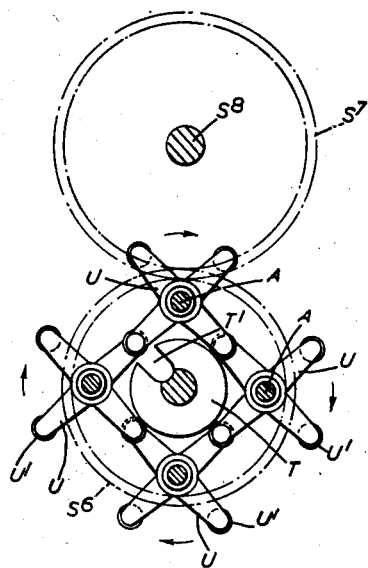
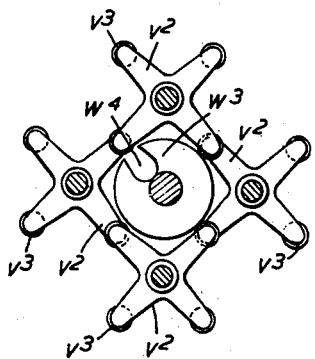
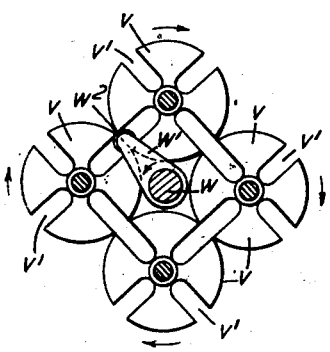
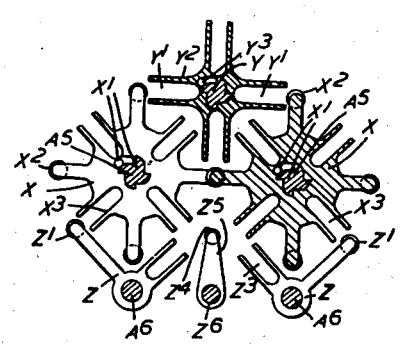

Patented May 17, 1949

2,470,675

UNITED STATES PATENT OFFICE 2,470,675

SPRING-OPERATED DRIVING MECHANISM

Archibald Allan, Whitley Bay, and Joseph Small, Gateshead, England, assignors to A. Reyrolle & Company Limited, Hebburn-on-Tyne, England, a company of Great Britain Application January 23, 1945, Serial No. 574,131
In Great Britain February 1, 1944

9 Claims. (Cl. 185—37)

This invention relates to spring-operated driving mechanism and is particularly applicable, although not limited, to mechanism for operating switchgear in which the rotation for example of an operating shaft performs a number of successive operations.

If a single spring or a number of springs connected together in series or in parallel is employed for such mechanism, the torque exerted on the shaft progressively declines so that the energy available for each operation is less than that available for the previous operation. One object of the invention is to overcome this disadvantage.

According to the present invention spring-operated driving mechanism comprises two or more driving springs, and means for controlling the release of energy from the springs so that they give up energy successively, one spring being prevented from giving up energy while another is allowed to do so. The invention is particularly applicable to arrangements in which a number of successively released springs are arranged to bring about movement of a single driven member, such as an operating shaft, either progressively in the same direction, or alternately to and fro. For example the mechanism may be arranged to operate a circuit-breaker, alternate opening and closing movements being energised by successively released springs or combinations of springs.

The periods of operation of two or more of the springs may overlap, for example a single initiating action may complete the discharge of a spring partially discharged in a previous operation and begin the discharge of another spring, or alternatively a single initiating action may completely discharge two or more springs.

In some cases the operations of winding the spring and driving by it may be effected by movement of opposite ends of the spring, but the converse arrangement, in which one end is anchored and the opposite end moves alternately in opposite directions for driving and rewinding, has the advantage that the movement of the spring is limited to a restricted angle and it is not necessary for the release and winding mechanisms to allow for continued progressive movement of the spring in successive operations.

The driven member may be connected to each spring through a free-wheel clutch, permitting it to be driven by any one spring while the other springs remain inoperative. Alternatively a cam member operatively connected to the driven member may be engaged by a plurality of cam followers operatively connected respectively to the several springs.

The invention may be carried into effect in many different ways but one specific embodiment and certain modifications thereof will be described by way of example with reference to the accompanying diagrammatic drawings in which—

Figure 1 is a diagrammatic perspective view of a spring driven mechanism for operating a circuit-breaker;

Figure 2 is a diagram indicating the operation of the winding cam;

Figure 3 is a section showing the operation of the trip plate H of Figure 1, looking along the axis;

Figure 4 is an axial section of a modified arrangement in which opposite ends of a spring move for winding and driving, respectively;

Figure 5 is an end view of the driving end of Figure 4;

Figure 6 is an end view of the winding end of Figure 4;

Figure 7 is an axial section of a further modified arrangement;

Figure 8 is an end view of the driving end of Figure 7;

Figures 9 and 10 are end views of different parts of the winding end of Figure 7, and Figure 11 is a diagram of a further modified arrangement in which the springs are wound in pairs.

The mechanism shown in the drawing is intended to provide energy for four operations of an auto reclosing circuit-breaker, namely the initial closing, and then in the event of a fault opening, trial reclosing and if necessary final opening. The energy for each operation is stored in one of four torsion bar springs A. Each of these is anchored at one end (not shown) and both winding and driving is performed by movement of the other end. Consequently the range of movement of the springs and associated mechanism is restricted to a to and fro oscillation corresponding to the angular deflection of the springs and it is not necessary for it to be capable of continued progressive movement in successive operations.

Each of the springs A is secured at one end to one of four spring shafts $A^1$ which are parallel to and symmetrical about a central main drive shaft B. Two of these spring shafts, and their associated mechanism, are broken away for clarity.

In the particular application the springs are accommodated in the bed plate of the circuit-breaker and the main shaft extends through the bed plate and drives a number of vertical operating shafts, one for each phase, through bevel gears. The main shaft B has keyed on it a pinion $B^1$ which meshes with each of four pinions $A^2$ each of which is mounted freely on one of the spring shafts $A^1$, but is connected to it by a free-wheel clutch constituted by a pawl $A^3$ on the pinion engaging a ratchet $A^4$ which is fixed to the shaft, and has four equally spaced teeth.

Hence if one of the springs is caused to rotate the drive shaft B in an anticlockwise direction, as seen in Figure 1, the pawl of each of the remaining springs will free-wheel over the ratchet a distance corresponding to one tooth.

The mechanism for winding or charging the springs is as follows. Each spring shaft $A^1$ has at its end remote from the spring an arm D carrying a roller $D^1$. A cam E is carried by a sleeve $E^1$ mounted freely on the central shaft B and arranged to be rotated by a worm wheel $E^2$ meshing with a worm F driven through suitable gearing alternatively either by a motor $F^1$ or a handle $F^2$. Figure 2 is a diagram of the action of the cam E from which it will be seen that one revolution of the cam rotates each of the spring shafts successively through an angle of about 90°.

The mechanism for holding the springs in their charged positions and releasing them at the proper time is as follows. Each of the spring shafts carries a projecting detent G the end of which abuts against a roller $G^3$ on the free end of a trigger arm $G^1$ of which the other end is carried by a fixed pivot $G^2$; when the trigger is in its normal or outward position in which it is held by engagement of a second roller $G^4$ on it with the periphery of a disc or trip plate H mounted to rotate freely on the central shaft B. The springs shown in Figure 3 at III and IV are held charged in this way. The trip plate H has however a recess $H^1$ in its periphery, and when this is brought opposite a trigger the latter can move inwardly towards the central shaft clearing the detent and releasing the spring. This is shown occurring in the case of the spring at II in Figure 3. Each detent is pivoted to the spring shaft at $G^6$ so that it can retract, against the action of a spring $G^5$ to clear the trigger as the main springs are being charged. For convenience of illustration this is shown as taking place at the spring I in Figure 3, although it fact it would not occur at the same time as the discharging operation of the spring shown at II.

The operation of the trip plate is associated with that of an overrunning stop. It will be appreciated that, as the main drive shaft is driven through free-wheel mechanism, a stop is desirable to prevent it from overshooting the correct position, and this stop must be rendered ineffective when the time comes for moving the shaft on to the next position. For this purpose there is rigidly secured to the central shaft a four-toothed ratchet J one tooth of which normally abuts against the end of a pivoted stop arm K, to prevent the central shaft from turning beyond the proper position in the driving direction. A stop release cam in the form of a second four-toothed ratchet L, with the teeth facing the other way, is rigidly secured by a sleeve $L^1$ to the trip plate H and operates a cam follower in the form of an arm $K^1$ rigidly connected to the stop arm K. The ratchet J and cam L are interconnected but permitted limited relative angular movement by a pin and slot connection $J^1$ $L^2$. When the cam L is in its normal or retarded position in relation to the ratchet J the cam follower $K^1$ is held outwardly and the stop thereby held inwardly in its operative position to prevent further rotation of the main drive shaft. If however the cam L is advanced in relation to the ratchet J the follower is permitted to swing inwardly, and the inclination of the ratchet teeth is sufficient to swing the stop outwardly and allow movement of the main shaft.

The release of the overrunning stop, and subsequent release of a trigger $G^1$ and main spring, is controlled by a trip lever M operated by a trip coil $M^1$. The trip plate H has on one face four studs $H^2$ for engagement by the trip lever. The latter has an end or nose $M^2$ which engages one stud tending to drive it forwardly when operated, and a hook-shaped extension $M^3$ which when released engages the previous stud to prevent it from overrunning.

Thus when the trip lever is operated (in a clockwise direction as seen in the drawing) the hook-shaped stop is first cleared from the stud it engages and the nose $M^2$ then starts to advance the trip plate. The initial advance clears the overrunning stop as already described and only after this is the recess $H^1$ in the trip plate brought opposite the trigger to release the first or next spring. Release of the spring A turns the shaft B through 90 degrees and as it does so the pin and slot connection $J^1$ $L^2$ carries the trip plate H and cam L with it in the normal or retarded position so that the overrunning stop K returns to its operative position in time to prevent the main drive shaft B from overshooting its correct position.

Instead of having a single cam E as described the winding mechanism may have two or more cams, for example one for each spring, so that as it moves through 90 degrees it simultaneously rewinds all the springs that have been released.

For use when the motor $F^1$ is employed for recharging the springs auxiliary switches N are fitted to the four shafts $A^1$ and to the driving shaft B, the contacts of which can be arranged so that the motor automatically starts up and rewinds the discharged springs when necessary and is automatically cut out when this is accomplished. The circuit of these switches forms no part of the present invention and it is thought unnecessary to describe it in detail. The winding may be arranged to be done in pairs of springs so that, in the case of a circuit-breaker, one spring may be discharged in closing the breaker and must not be rewound until a second spring has been discharged by the opening of the breaker, thus ensuring that there is always a charged spring in reserve to trip out the breaker in emergency. In the case of an auto-reclosing breaker, the mechanism will always have three charged springs in reserve—one for a trip, one for a reclosure, and a third for a final trip. The auxiliary switches also prevent the breaker being deliberately closed unless four springs are charged in the case of auto-reclosing or in case of non-auto-reclosing two springs must be charged.

The shaft B may have connected to it a dashpot P so arranged as to bring the mechanism to rest gently at the completion of the discharge of each spring. This dashpot may consist of an air cylinder, an oil cylinder or some automatic friction brake device.

The arrangement described is considerably simplified by the fact that charging and driving are performed by the same end of the spring and the winding and release mechanism do not therefore have to allow for continued progressive rotation of the spring shaft in one direction, but only to and fro oscillation through a limited angle, in this particular case 90 degrees. The invention is not however limited to arrangements in which charging and driving are performed by movement of the same end of the spring and certain arrangements will be described in which each spring is charged by rotating one end of it while its other end is connected to the mechanism to be driven.

In one arrangement shown in Figures 4 to 6 the mechanism comprises four torsion bar springs A mounted parallel with each other at the corners of a square. At one end each spring carries a pinion Q meshing with a common central pinion $Q^1$ which can be turned by means of a worm $Q^2$ and worm wheels $Q^3$ operated manually or electrically to wind up the springs. At the other end each spring carries a double-ended arm R mounted at its centre on the springs and carrying a roller $R^1$ at each end to engage an annular cam $S^1$ in the form of a ring having a radial slot $S^2$ in its inner surface. Actually there are two rings $S^1$ in parallel planes forming part of a single rotary member S mounted in bearings to rotate about the axis about which the springs are symmetrical. Two of the springs at opposite corners of the square engage one cam and the other two engage the other cam. Accordingly when the springs are wound up, one of the rollers $R^1$ which is opposite its slot will exert a torque on the rotor and tend to turn it round. During this time the rollers of the other three springs will be bearing on the cylindrical inner surface of the cam $S^1$ and these springs will therefore be prevented from unwinding and giving up energy. The moving end of the spring turns through about half a revolution before the roller comes out of the slot again and the other roller prevents further unwinding of the spring. By this time a roller on the next spring has entered the slot in the other cam and is ready to continue the motion.

Owing to the presence of a second roller on the end of each spring, the spring can perform a second half revolution after its opposite end has been rewound, and this brings the original roller back into place so that further half revolutions can be made use of as the springs are alternately wound up and released.

The rotary member is controlled and connected to the mechanism to be driven in any suitable manner. For example as shown in Figure 5 it may have on its outer surface four teeth $S^3$ engaged by a pawl $S^4$ which is withdrawn by a solenoid $S^5$ to start the mechanism and may be released sufficiently rapidly to stop it again when it has performed a quarter of a revolution. The rotor may also have gear teeth $S^6$ formed on its outer periphery to mesh with a pinion $S^7$ the shaft $S^8$ of which drives the mechanism to be operated.

A modified arrangement is similar to that described except that six springs are provided at the corners of a regular hexagon. In fact any convenient number of springs may be employed.

The surface of the ring apart from the radial slot has been described as being a circular arc but it will be appreciated that other forms of surface may also be used. In particular it may be desirable to make the surface curve inwards to a smaller radius so as to tend to wind up each spring just before its roller reaches the slot. This will tend to slow down the mechanism towards the end of each unit of operation and will also make available slightly more energy for the next operation.

In a further arrangement shown in Figures 7 to 10 the cam (seen in Figure 8) consists of a disc T with a radial slot $T^1$ in its outer periphery. In this case each spring carries a four-armed cross U provided with four rollers U'. The operation and remaining parts of the release and operating mechanism are similar to that already described in connection with Figures 4 to 6 and it appears unnecessary to describe them further.

Instead of a four-armed cross each spring may carry a star-shaped member with any convenient number of arms, for example six arms, in which case the radial length of the arms and the spacing between the spring and the driven member must be so proportioned to the size of the cam that between the moments when the roller enters and leaves the slot the end of the spring moves through 60 degrees, and the cam through the angular spacing between the springs, for example 90 degrees in the case of four springs.

In the arrangement described above with reference to Figures 4 to 6 all the springs are wound up simultaneously and hence they must all be unwound to an equal extent before they are wound up again. In the modified arrangement shown in Figures 7 to 10 the springs are wound up successively in the same order as they are discharged and any one or more subsequently discharged may be rewound so that the battery of springs is restored at will to the fully charged condition. The mechanism employed is somewhat analogous to the driving mechanism. Each spring has on its end a disc V in which are four radial slots $V^1$. An arm $W^1$ on a central winding shaft W carries a roller $W^2$ arranged to engage in one of these slots $V^1$ and turn the disc through a right angle as the winding shaft turns through a right angle. As it leaves a slot on a disc of one spring it enters a slot on a disc of the next spring. In addition to the arrangement described for winding up the springs, some mechanism is necessary for preventing each one from unwinding as soon as the winding roller leaves its slot. For this purpose each spring also carries a four-armed cross $V^2$, each arm of which carries a roller $V^3$. These are arranged as at the operating end of the springs to bear upon two cams each in the form of a disc $W^3$ with a radial slot $W^4$ in it. The discs are mounted on the winding shaft W so that as the roller $W^2$ on the winding arm $W^1$ enters a slot $V^1$ in the disc V of a particular spring, the slot $W^4$ in the retaining cam $W^3$ will come opposite the roller $V^3$ on the cross $V^2$ of the same spring and allow it to rotate. At all other times the roller on the cross engages the arcuate periphery of the retaining disc and prevents the end of the spring from rotating.

In some cases it may be desirable that springs should only be capable of being rewound in pairs, for example for a switch-gear where rewind after a single make shot is prohibited and is only permissible when the oil circuit-breaker has performed a complete make-break operation. For such applications one arrangement shown in Figure 11 comprises what for simplicity may be termed primary springs $A^5$ and secondary springs $A^6$. Each primary spring $A^5$ has a plate X connected to it through a pawl and ratchet $X^1$, and carrying rollers $X^2$ entering slots $Y^1$ in a plate $Y^2$ connected by pawl and ratchet $Y^3$ to the drive shaft Y. Hence a primary spring when released operates the drive shaft in a manner similar to that of some of the arrangements already described. The plate X of the primary spring also has slots $X^3$ which can be entered by a roller $Z^1$ on a plate Z connected to, and mounted on, a secondary spring $A^6$. Hence when a secondary spring is released it drives the plate of the associated primary spring, which free-wheels on the spring, and thereby drives the drive shaft.

The plate of the secondary spring also has in it a slot $Z^3$ to be entered by a roller $Z^4$ on a lever $Z^5$ carried by a winding shaft $Z^6$. Hence when the winding shaft is rotated it winds the primary and secondary springs simultaneously while the plate $Y^2$ on the drive shaft free-wheels. Any number of pairs of primary and secondary springs may be employed according to requirements.

It will be appreciated that the invention is not limited to the arrangements described by way of example. Thus for instance other forms of spring may be used such as helical tension or compression, volute, laminated, or spiral which may for example act either directly or through a system of levers on cam followers in arrangements otherwise similar to certain of those described.

Moreover whilst the invention is confined to arrangements in which certain springs operate in sequence it is not essential that one spring should finish operating before the next begins and in addition other pairs of springs may be arranged to operate simultaneously.

It is to be understood that where complete discharge of a spring is referred to in the present specification and claims, this means complete discharge within the working range of the mechanism and not necessarily that the spring is completely unloaded by such discharge.

What we claim as our invention and desire to secure by Letters Patent is:

1. Spring operated driving mechanism comprising a single driven member, at least two driving springs, retaining means for holding each of the springs in the charged condition, a driving connection from each spring to the driven member permitting the latter to be driven through a working operation by each spring in succession while other springs remain inoperative, means for limiting the movement of the driven member on the completion of a working operation and retaining it until the initiation of the next working operation, externally initiated release means to release the driven member limiting means at each actuation and to release different driving springs in successive actuations and independent means for charging the driving springs.

2. Mechanism as claimed in claim 1 in which the rewinding of the springs is effected by a cam arranged to engage successively a number of cam followers connected respectively to the several springs to wind the latter successively.

3. Mechanism as claimed in claim 1 in which the operations of winding a spring and driving by it are effected by movement of the same end of the spring.

4. Spring operated driving mechanism comprising a single driven member, at least two driving springs, a driving connection from each spring to the driven member including a cam follower operatively connected with each spring, and a cam operatively connected with the driven member and adapted to be driven by each spring in succession while retaining other springs inoperative, and externally initiated retaining and release means for retaining the driven member until released for each operation, releasing it at the beginning of each operation and limiting its movement at the end of each operation.

5. Mechanism as claimed in claim 4 in which the cam is in the form of a ring or disc having a radial slot in its periphery while each cam follower comprises an arm carrying a roller-like member to ride round the periphery of the cam thereby preventing discharge of the spring until the slot reaches the cam follower which can then enter the slot and release energy from the spring to the driven member.

6. Spring operated driving mechanism comprising a single driven member adapted to perform a number of successive working operations, at least two driving springs for operating the driven member, a trigger for retaining and releasing each spring, and a single externally initiated release member for releasing the several triggers in succession through a working operation.

7. Spring operated driving mechanism comprising a single driven member, at least two driving springs, retaining means for holding the springs in a charged condition, a driving connection from each spring to the driven member including a freewheel clutch permitting the driven member to be driven by each spring in succession through a working operation while other springs remain inoperative, means for limiting the movement of the driven member on the completion of a working operation and retaining it until the initiation of the next working operation, externally initiated release means to release the driven member limiting means at each actuation and to release different driving springs in successive actuations, and independent means for charging the driving springs.

8. Mechanism as claimed in claim 7, including an overrunning stop serving to prevent the driven member from travelling beyond the desired position at the end of each operation and to retain it in this position until the next operation is initiated.

9. Mechanism as claimed in claim 8 in which at each operation the initial movement of the retaining and release means serves to disengage the overrunning stop before releasing the next spring, and after releasing the latter re-engages the overrunning stop in time to prevent the driven member for overshooting the desired position.

ARCHIBALD ALLAN.
JOSEPH SMALL.

REFERENCES CITED

The following references are of record in the file of this patent:

UNITED STATES PATENTS

| Number | Name | Date |
|---|---|---|
| 229,887 | Horton | July 13, 1880 |
| 262,687 | Myers | Aug. 15, 1882 |
| 300,753 | Austin | June 24, 1884 |
| 468,167 | Wortmann | Feb. 2, 1892 |
| 1,122,687 | Clark | Dec. 29, 1914 |
| 1,217,935 | Gephart | Mar. 6, 1917 |